(12) United States Patent
Kato

(10) Patent No.: US 8,744,727 B2
(45) Date of Patent: Jun. 3, 2014

(54) CONTROL DEVICE FOR INTERNAL COMBUSTION ENGINE

(75) Inventor: Naoto Kato, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/636,902

(22) PCT Filed: May 13, 2010

(86) PCT No.: PCT/JP2010/058122
§ 371 (c)(1),
(2), (4) Date: Sep. 24, 2012

(87) PCT Pub. No.: WO2011/142018
PCT Pub. Date: Nov. 17, 2011

(65) Prior Publication Data
US 2013/0046455 A1   Feb. 21, 2013

(51) Int. Cl.
F02D 41/04   (2006.01)
(52) U.S. Cl.
USPC .......................................... 701/104
(58) Field of Classification Search
CPC ... F02D 37/02; F02D 11/105; F02D 2250/18; F02D 2041/1432; F02D 14/1497
USPC .......... 123/406.12, 406.24, 406.45, 478, 486, 123/672; 180/282–285; 60/285; 701/103, 701/104, 11
See application file for complete search history.

(56) References Cited

U.S. PATENT DOCUMENTS 6,000,376 A * 12/1999 Hess et al. .................... 123/333
6,155,230 A * 12/2000 Iwano et al. ............. 123/339.16
6,512,983 B1 * 1/2003 Bauer et al. ..................... 702/41
6,892,527 B2 * 5/2005 Ueda et al. ....................... 60/277
7,869,931 B2 * 1/2011 Satou et al. .................... 701/111
(Continued)

FOREIGN PATENT DOCUMENTS

DE   196 18 893 A1   11/1997
DE   198 51 990 A1   6/2000
(Continued)

OTHER PUBLICATIONS

International Search Report Issued Jun. 15, 2010 in PCT/JP10/58122 Filed May 13, 2010.

(Continued)

*Primary Examiner* — Stephen K Cronin
*Assistant Examiner* — Elizabeth Hadley
(74) *Attorney, Agent, or Firm* — Oblon, Spivak, McClelland, Maier & Neustadt, L.L.P.

(57) ABSTRACT

A control device for an internal combustion engine which can highly precisely realize required torque including a high-frequency component with high responsiveness. The control device sets torque with a low frequency included in the required torque as an air quantity controlling torque, and calculates a target air quantity for realizing the air quantity controlling torque based on data in which a relationship of the air quantity and torque is set. The control device controls the air quantity in accordance with the target air quantity. Further, the control device sets torque including both a low frequency and a high frequency as air-fuel ratio controlling torque, and calculates an air-fuel ratio corresponding to the air-fuel ratio controlling torque and a present air quantity as a target air-fuel ratio. The control device controls a fuel injection amount in accordance with the target air-fuel ratio.

16 Claims, 4 Drawing Sheets

(56) References Cited

U.S. PATENT DOCUMENTS

| | | |
|---|---|---|
| 2006/0218898 A1 | 10/2006 | Satou et al. |
| 2007/0010931 A1* | 1/2007 | Kraemer et al. .............. 701/109 |
| 2010/0004829 A1 | 1/2010 | Tanaka et al. |
| 2013/0282259 A1* | 10/2013 | Takahashi et al. ............ 701/103 |

FOREIGN PATENT DOCUMENTS

| | | |
|---|---|---|
| DE | 10 2004 012 522 B3 | 1/2006 |
| EP | 0 899 439 A2 | 3/1999 |
| EP | 1 662 126 A1 | 5/2006 |
| JP | 7 189799 | 7/1995 |
| JP | 9 240322 | 9/1997 |
| JP | 11 82090 | 3/1999 |
| JP | 2000 120468 | 4/2000 |
| JP | 2002 147225 | 5/2002 |
| JP | 2003 65123 | 3/2003 |
| JP | 2008 64001 | 3/2008 |
| JP | 2009 68430 | 4/2009 |
| JP | 2009 215949 | 9/2009 |
| JP | 2010 84671 | 4/2010 |

OTHER PUBLICATIONS

Extended European Search Report issued Oct. 7, 2013 in Patent Application No. 10851401.9.

* cited by examiner

CONTROL DEVICE FOR INTERNAL COMBUSTION ENGINE

TECHNICAL FIELD

The present invention relates to a control device for an internal combustion engine, and more particularly to a control device for an internal combustion engine that can control torque according to an intake air quantity, ignition timing and an air-fuel ratio.

BACKGROUND ART

There is known a method for damping a vehicle body sprung mass vibration in an automobile, in particular, pitching vibration by torque control of an internal combustion engine. Hereinafter, torque control of an internal combustion engine for this purpose will be especially called sprung mass vibration damping control. In the sprung mass vibration damping control, the pitching vibration corresponding to a present driving force is obtained from a vehicle body sprung mass vibration model, and vibrational correction torque which cancels out the pitching vibration is calculated. Subsequently, basic required torque calculated from an accelerator opening is corrected according to the correction torque, and the output torque of the internal combustion engine is controlled in accordance with the required torque after correction. More specifically, in sprung mass vibration damping control, the torque which is outputted by an internal combustion engine is vibrationally changed.

Torque control in an internal combustion engine, in particular, torque control in the case of a gasoline engine is generally performed by controlling an intake air quantity by operation of a throttle. When torque is to be vibrationally changed, the throttle can be vibrationally moved to increase and decrease the intake air quantity actively. However, there is a delay in response of the intake air quantity to the operation of the throttle, and therefore, required torque cannot be always realized with high responsiveness. For example, when the required torque includes a high-frequency component as in the aforementioned sprung mass vibration damping control, a desired high-frequency component is difficult to create by only the control of the intake air quantity, and the required torque is unlikely to be realized with high precision.

As above, with only the control of the intake air quantity by operation of a throttle, the range of the realizable required torque is narrow, and there is the fear that the required torque cannot be completely realized. In order to realize the required torque including a high-frequency component with high precision, torque control by the actuator with torque responsiveness higher than a throttle is required. In regard with this point, Japanese Patent Laid-Open No. 2009-068430 describes the method for performing torque control by cooperatively operating a throttle and an ignition device. According to the method described in the publication, a target air quantity is determined based on the required torque, and a throttle opening is calculated from the target air quantity with use of an inverse model of an air model. Further, in parallel with this, estimation torque which is achieved with the present throttle opening is calculated, and a correction amount of ignition timing is determined in accordance with the difference of the required torque and the estimation torque.

According to the method described in Japanese Patent Laid-Open No. 2009-068430, when the required torque cannot be realized by only control of the intake air quantity by operation of the throttle, the excess or deficiency can be compensated by correction of the ignition timing. Torque control by operation of an ignition device is extremely high in responsiveness of torque as compared with that by operation of a throttle. Consequently, it is conceivable that according to the method described in the aforesaid publication, even if a high-frequency component is included in the required torque as in the aforementioned sprung mass vibration damping control, the required torque can be realized with high precision.

However, a problem also exists in the method described in the aforesaid publication. When retardation of the ignition timing is frequently performed in accordance with the high-frequency component of the required torque, the fuel consumption performance is worsened due to reduction of efficiency. Fuel consumption performance is one of the important performances required of automobiles similarly to improvement of drivability which is the object of sprung mass vibration damping control. Accordingly, increasing achievability of the required torque so as not to impair the fuel consumption performance is required of torque control, in particular, sprung mass vibration damping control of an internal combustion engine.

Incidentally, in the case of a spark ignition type internal combustion engine like a gasoline engine, an air-fuel ratio is also closely related to the torque which is generated by the internal combustion engine, in addition to an intake air quantity and ignition timing. Therefore, as is described in, for example, Japanese Patent Laid-Open No. 11-82090, there is known the method for controlling an intake air quantity, a fuel injection amount and ignition timing in accordance with target torque and a target air-fuel ratio. Further, as is described in Japanese Patent Laid-Open No. 9-240322, there is also known the art of controlling an air-fuel ratio in accordance with the magnitude of the torque generated by an internal combustion engine.

In the method descried in Japanese Patent Laid-Open No. 11-82090, a target air-fuel ratio is determined from the operation conditions such as a water temperature and an atmospheric pressure, and from the target torque and the target air-fuel ratio, a target intake air quantity, a target fuel injection amount and target ignition timing are calculated. According to the method, torque control can be performed by using not only an intake air quantity and ignition timing, but also a fuel injection amount, and therefore, the realization range of the required torque is considered to be more widened.

However, there is a large difference between response of an actual intake air quantity to a change of a target intake air quantity, and response of an actual fuel injection amount to a change of a target fuel injection amount. Therefore, in the method described in Japanese Patent Laid-Open No. 11-82090, a deviation occurs between the target air-fuel ratio and the actual air-fuel ratio in a transitional state in which the air quantity changes. As a result, a deviation also occurs between the required torque and the actual generation torque. Further, the target ignition timing is determined from a map of the air quantity and an engine speed, and therefore, the excess or deficiency amount with respect to the required torque cannot be compensated by correction of ignition timing. Accordingly, it has to be said that with the method described in the aforementioned Japanese Patent Laid-Open No. 11-82090, the required torque including a high-frequency component is difficult to realize highly precisely with high responsiveness.

SUMMARY OF INVENTION

The present invention has an object to realize required torque including a high-frequency component highly precisely with high responsiveness in an internal combustion engine. In order to attain such an object, the present invention provides a control device for an internal combustion engine as follows.

A control device provided by the present invention acquires required torque which is required of an internal combustion engine. More preferably, the control device acquires required torque which includes both a low-frequency component and a high-frequency component, and enables the low-frequency component to be extracted from the required torque. Alternatively, it is also preferable that the control device acquires required torque constituted of a low-frequency component and required torque constituted of a high-frequency component, and enables them to be combined into torque which includes both low frequency and high frequency.

The control device sets the torque with a low frequency which can be obtained from the acquired required torque as air quantity controlling torque. Subsequently, the control device calculates a target air quantity for realizing the air quantity controlling torque. In calculation of the target air quantity, data in which a relationship of an air quantity and torque is set can be used. The control device controls the air quantity in accordance with the target air quantity.

Further, the control device sets the torque which is obtained from the acquired required torque and includes a low frequency and a high frequency as air-fuel ratio controlling torque. Subsequently, the control device calculates a present air quantity, and calculates an air-fuel ratio corresponding to the air-fuel ratio controlling torque and the present air quantity as a target air-fuel ratio. For calculation of the target air-fuel ratio, data in which a relationship of the air-fuel ratio and torque is set by being associated with the air quantity can be used. The control device controls a fuel injection amount in accordance with the target air-fuel ratio.

According to the control device which is configured as above, out of the low-frequency component and the high-frequency component which are included in the require torque, only the low-frequency component is reflected in the target air quantity, and the high-frequency component is reflected in the target air-fuel ratio. By this, operation of the actuator which controls the air quantity can be stabilized, and at the same time, the air-fuel ratio is periodically changed by the fuel injection amount control in accordance with the target air-fuel ratio, whereby the required torque including a high-frequency component can be realized with high responsiveness.

In another mode of the control device provided by the present invention, the control device further calculates target ignition timing for realizing air-fuel ratio controlling torque under the present air quantity and the target air-fuel ratio. For calculation of the target ignition timing, data in which a relationship of ignition timing and torque is set by being associated with the air quantity and the air-fuel ratio can be used. The control device controls the ignition timing in accordance with the target ignition timing. According to the mode like this, even if the torque component which cannot be realized by regulation of the air-fuel ratio is present, the amount thereof can be compensated by correction of the ignition timing. More specifically, the required torque can be realized with higher precision. Further, the case in which correction of the ignition timing is performed is limited to the case in which the required torque cannot be completely realized with regulation of the air-fuel ratio, and therefore, worsening of the fuel consumption performance accompanying retardation of the ignition timing is suppressed to the minimum.

In the control device provided by the present invention, the air quantity controlling torque may be corrected by raising it. By doing so, the target air quantity is raised, and the present air quantity is increased. By this, when the fuel injection amount is controlled in accordance with the high-frequency component of the required torque, the situation can be prevented, in which torque becomes insufficient due to insufficiency of the air quantity. As the raising amount in the case of raising the air quantity controlling torque, the raising amount corresponding to the amplitude of the high-frequency torque is preferable.

In still another mode of the control device provided by the present invention, the control device further determines the oxygen occlusion state of a catalyst, and when the oxygen occlusion amount of the catalyst is a predetermined value or larger, the control device corrects the air quantity controlling torque so that the air-fuel ratio varies with a region at a richer side than stoichiometry as a center, whereas when the oxygen occlusion amount of the catalyst is less than the predetermine value, the control device corrects the air quantity controlling torque so that the air-fuel ratio varies with a region at a leaner side than stoichiometry as the center. According to the mode like this, the oxygen occlusion state of the catalyst can be kept in a proper state while the air-fuel ratio is varied in accordance with the high-frequency component of the required torque.

In still another mode of the control device which is provided by the present invention, the control device further determines an activation state of a catalyst, and when the catalyst is not activated, variation of the target air-fuel ratio is restricted. Under the situation in which the purification performance by the catalyst is not sufficiently secured, variation of the air-fuel ratio increases exhaust emission, and causes worsening of the exhaust gas performance. However, according to the mode like this, variation of the air-fuel ratio is restricted, whereby worsening of the exhaust gas performance can be prevented.

DESCRIPTION OF EMBODIMENTS

Embodiment 1

Embodiment 1 of the present invention will be described with reference to FIG. 1 and FIG. 2.

An internal combustion engine (hereinafter, an engine) which is a target of control in each embodiment of the present invention is a spark ignition type 4-cycle reciprocal engine. A control device controls operation of the engine by operating actuators included in the engine. The actuators which can be operated by the control device include various actuators such as an ignition device, a throttle, a fuel injection device, a variable valve timing mechanism, and an EGR device. However, in the present embodiment, the control device operates the throttle, the ignition device and the fuel injection device, and the control device operates these three actuators to control torque which is outputted by the engine.

Figure 1:
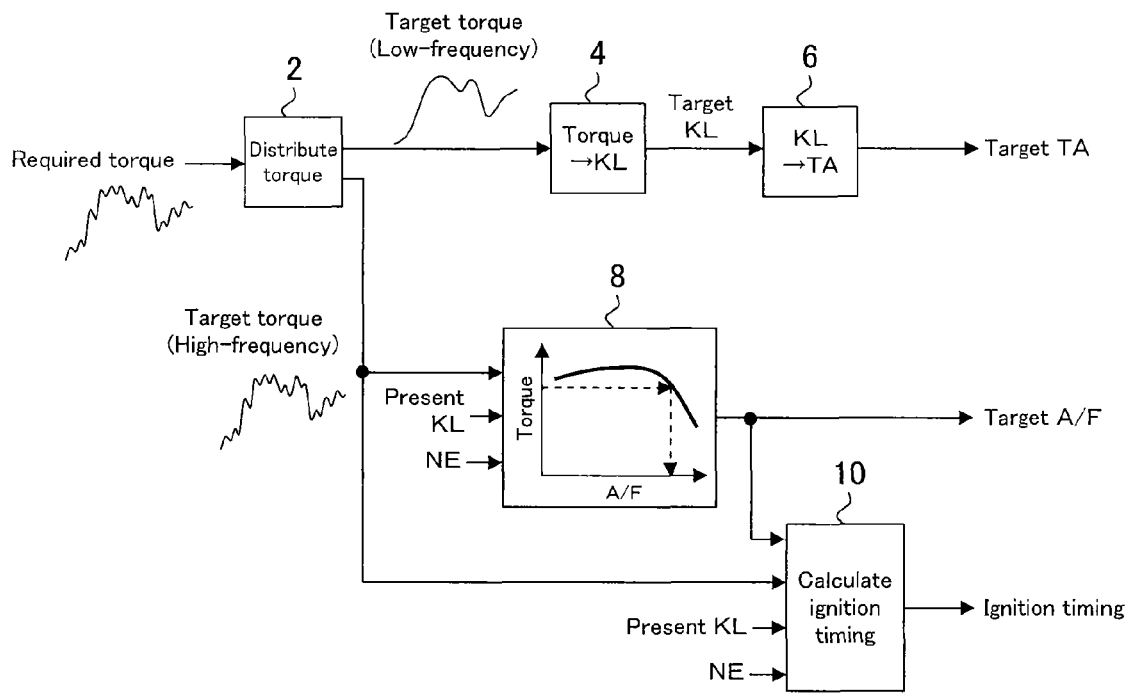
FIG. 1 is a block diagram showing a configuration of a control device for an internal combustion engine of embodiment 1 of the present invention.
Figure 2:
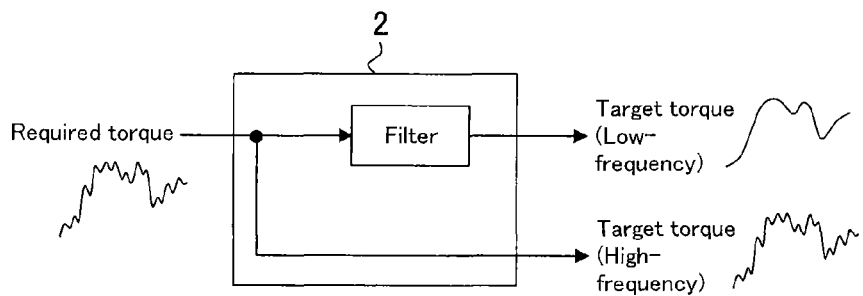
FIG. 2 is a block diagram showing a configuration of a torque distributing section of the control device shown in FIG. 1.

FIG. 1 is a block diagram showing a configuration of the control device of embodiment 1 of the present invention. The present control device can be divided into a torque distributing section 2, a target air quantity calculating section 4, a target throttle opening calculating section 6, a target air-fuel ratio calculating section 8 and an ignition timing calculating section 10 according to functions which the control device has. However, these elements 2, 4, 6, 8 and 10 are the result of especially expressing only the elements relating to torque control by operation of three actuators, that is, the throttle, the ignition device and the fuel injection device, out of various functional elements which the present control device has. Accordingly, FIG. 1 does not mean that the present control device is configured by only these elements. The respective elements may be configured by exclusive pieces of hardware, or may share hardware and may be virtually configured by software. Hereinafter, the configuration of the present control device will be described with a focus on the functions of the respective elements 2, 4, 6, 8 and 10.

The present control device receives supply of required torque from a vehicle control device which totally controls an entire vehicle. The required torque includes drive required torque which is determined based on an accelerator opening. Further, system required torque which is determined based on signals from control systems for a vehicle such as a VSC, a TRC and an ECT is included in accordance with necessity. When sprung mass vibration damping control is required, sprung mass vibration damping required torque is included in the required torque. In the following description, the required torque including sprung mass vibration damping required torque is assumed to be supplied to the present control device.

The required torque which is supplied to the present control device is inputted into the torque distributing section 2. The torque distributing section 2 has the function of extracting a low-frequency component from the inputted required torque. FIG. 2 is a block diagram showing a configuration of the torque distributing section 2. As shown in the drawing, the torque distributing section 2 has a low-pass filter. The torque distributing section 2 duplicates the inputted required torque, and one required torque is outputted as a target torque after being passed through the low-pass filter. Subsequently, the other required torque is directly outputted as target torque. The former target torque is a torque with a low frequency from which high-frequency components are excluded by the low-pass filter, whereas the latter target torque is the torque which includes both a low frequency and a high frequency similarly to the required torque. Hereinafter, the former will be called as a low-frequency target torque, and the latter will be called a high-frequency target torque, whereby both of them are distinguished from each other.

The present control device uses the low-frequency target torque as an air quantity controlling torque. Therefore, the low-frequency target torque outputted from the torque distributing section 2 is inputted in the target air quantity calculating section 4. The target air quantity calculating section 4 converts the low-frequency target torque into a target air quantity (target KL) by using an air quantity map. The air quantity mentioned here means an air quantity which is taken into a cylinder (a charging efficiency or a load factor which is the result of making it dimensionless can be used instead). The air quantity map is the map in which on the precondition that the ignition timing is optimal ignition timing (ignition timing at a more retarded side out of MBT and trace knock ignition timing), and the air-fuel ratio is a base air-fuel ratio, torque and the air quantity are associated with each other with various engine state amounts including an engine speed as a key. The base air-fuel ratio is a target air-fuel ratio which is set when sprung mass vibration damping control is not carried out, namely, in ordinary torque control. The value thereof is not limited, and, for example, the base air-fuel ratio can be set at a stoichiometric air-furl ratio. In the target air quantity calculating section 4, the air quantity necessary for realization of the low-frequency target torque is calculated as a target air quantity for the engine.

The target air quantity is inputted in the target throttle opening calculating section 6. The target throttle opening calculating section 6 converts the target air quantity into a target throttle opening (target TA) by using an inverse model of an air model (air inverse model). The air model is a physical model which is obtained by modeling the response characteristic of the air quantity to the operation of the throttle, and therefore, by using the inverse model thereof, the throttle opening which is necessary for realization of the target air quantity can be inversely calculated.

In the target throttle opening calculating section 6, the throttle opening necessary for realization of the target air quantity is calculated as a target throttle opening. The present control device performs an operation of the throttle in accordance with the target throttle opening calculated in the target throttle opening calculating section 6.

Meanwhile, in regard with the high-frequency target torque, the present control device uses it as an air-fuel ratio controlling torque. Therefore, the high-frequency target torque outputted from the torque distributing section 2 is inputted in the target air-fuel ratio calculating section 8. The target air-fuel ratio calculating section 8 converts the high-frequency target torque into a target air-fuel ratio (target A/F) by using an air-fuel ratio map. The air-fuel ratio map is the map in which on the precondition that the ignition timing is optimal ignition timing, the torque and the air-fuel ratio are associated with each other with various engine state amounts including the air quantity and the engine speed as a key. For search of the air-fuel ratio map, the actual value of each of the engine state amounts is used. The same thing applies to the air quantity, and the present air quantity (present KL) which is realized by operation of the throttle is used for map search. By using the forward model of the aforementioned air model, the present air quantity can be calculated from the throttle opening.

In the target air-fuel ratio calculating section 8, the air-fuel ratio necessary for realization of the high-frequency target torque is calculated as the target air-fuel ratio of the engine. The high-frequency target torque corresponds to the result of adding a high-frequency component to the low-frequency target torque. According to the air-fuel ratio map, the target air-fuel ratio is calculated as a sum of the air-fuel ratio corresponding to the low-frequency target torque and the air-fuel ratio change amount corresponding to the high-frequency component. The former is equal to the base air-fuel ratio, and the latter periodically changes with the same frequency as the high-frequency component. As a result, the target air-fuel ratio which is outputted from the target air-fuel ratio calculating section 8 periodically changes with the same frequency as the high-frequency component with the base air-fuel ratio as a center. The present control device performs operation of the fuel injection device in accordance with the target air-fuel ratio which periodically changes with a high frequency like this.

The high-frequency target torque outputted from the torque distributing section 2 is duplicated before being inputted in the target air-fuel ratio calculating section 8, and the duplicated high-frequency target torque (air-fuel ratio controlling torque) is inputted in the ignition timing calculating section 10. The ignition timing calculating section 10 converts the high-frequency target torque into ignition timing by using an ignition timing map. The ignition timing map is the map in which the torque and the ignition timing are associated with each other with various engine state amounts including the air-fuel ratio, the air quantity and the engine speed as a key. For search of the ignition timing map, the actual value or the target value of each of the engine state amounts is used. In regard with the air quantity, the present air quantity which is the actual value thereof is used for map search. Meanwhile, in regard with the air-fuel ratio, the target air-fuel ratio which is outputted from the target air-fuel ratio calculating section 8 is used for map search.

In the ignition timing calculating section 10, under the air-fuel ratio which periodically changes with a high frequency, the ignition timing which is necessary for realization of the high-frequency target torque is calculated as the ignition timing of the engine. The present control device performs operation of the ignition device in accordance with the ignition timing calculated in the ignition timing calculating section 10.

As the result of being configured as above, according to the present control device, the following advantages are obtained.

In the present control device, out of the low-frequency component and the high-frequency component which are included in the required torque, only the low-frequency component is reflected in the target air quantity, and the high-frequency component is reflected in the target air-fuel ratio. More specifically, in regard with the low-frequency component, the present control device achieves realization thereof by air quantity control in accordance with the target air quantity, and in regard with the high-frequency component, the present control device achieves realization thereof by air-fuel control in accordance with the target air-fuel ratio. The torque control via air-fuel ratio control by operation of the fuel injection device has extremely high responsiveness of torque as compared with the torque control via the air quantity control by operation of the throttle. Consequently, according to the present control device, required torque can be realized with high responsiveness while the throttle is stably operated.

Further, according to the present control device, even if the high-frequency target torque cannot be completely realized with air-fuel ratio control, the excess or deficiency can be compensated by correction of the ignition timing. For example, when the torque which is estimated from the target air-fuel ratio, the present air quantity and the engine speed is higher than the high-frequency target torque, the ignition timing which is corrected to a more retarded side than the optimal ignition timing is calculated from the ignition timing map. Meanwhile, when the torque which is estimated from the target air-fuel ratio, the present air quantity and the engine speed coincides with the high-frequency target torque, the ignition timing which is calculated from the ignition timing map coincides with the optimal ignition timing. More specifically, only when the high-frequency target torque cannot be completely realized with the air-fuel ratio control, torque compensation by correction of the ignition timing is performed. Consequently, according to the present control device, the required torque including a high-frequency component can be realized with high precision while worsening of the fuel consumption performance accompanying retardation of the ignition timing is restrained to the minimum.

Embodiment 2

Next, embodiment 2 of the present invention will be described with reference to FIG. 3.

Figure 3:
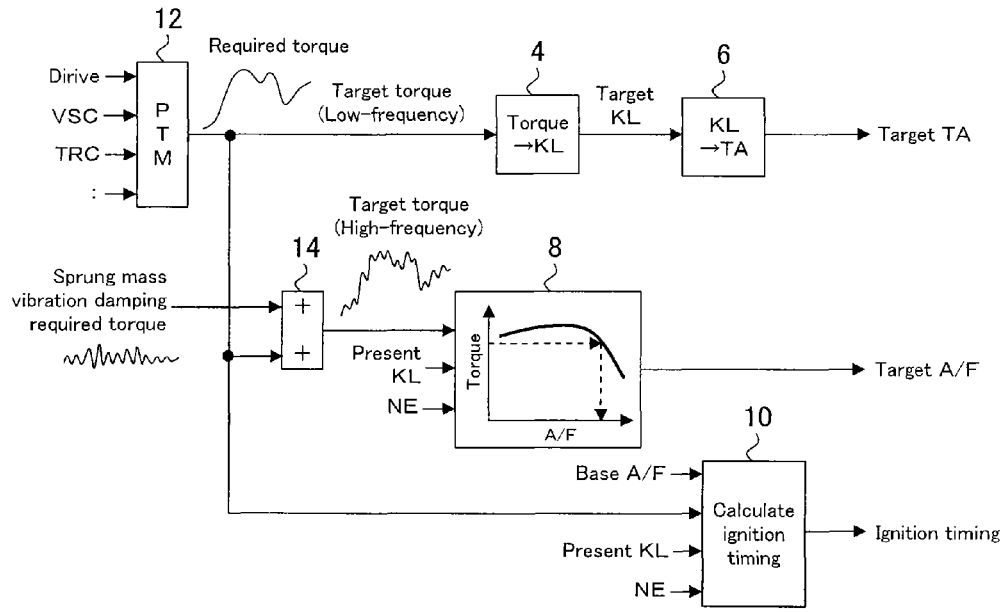
FIG. 3 is a block diagram showing a configuration of a control device for an internal combustion engine of embodiment 2 of the present invention.

FIG. 3 is a block diagram showing a configuration of a control device of embodiment 2 of the present invention. The present control device can be divided into a power train manager (PTM) 12, the target air quantity calculating section 4, the target throttle opening calculating section 6, a torque combining section 14, the target air-fuel ratio calculating section 8 and the ignition timing calculating section 10 according to the functions which the control device has. Out of the elements 12, 4, 6, 14, 8 and 10 which configure the present control device, the elements 4, 6, 8 and 10 which are common to the control device of embodiment 1 in the functions are assigned with the same reference signs. In the following description, the explanation of the elements 4, 6, 8 and 10 which are common to embodiment 1 will be omitted or simplified, and the configuration of the present control device will be described with a focus on the functions of the elements 12 and 14 which are newly provided in the present embodiment.

One characteristic of the present control device lies in the point that the required torque constituted of a low-frequency component and the required torque constituted of a high-frequency component are separately acquired. The power train manager 12 is supplied with drive required torque which is determined based on an accelerator opening, and system required torque which is determined based on signals from control systems of a vehicle such as a VSC and a TRC. The power train manager 12 outputs the torque obtained by integrating them as required torque. The required torque which is outputted by the power train manager 12 is the required torque constituted of a low-frequency component. The required torque is directly used as target torque. Hereinafter, the target torque will be called low-frequency target torque.

Meanwhile, the required torque constituted of a high-frequency component includes sprung mass vibration damping required torque which is issued when sprung mass vibration damping control is required. The duplicate of the required torque which is outputted from the power train manager 12 is inputted into the torque combining section 14 together with sprung mass vibration damping required torque. The torque combining section 14 combines these two kinds of required torque, that is, the required torque constituted of a low-frequency component and the required torque constituted of a high-frequency component, and outputs the combined torque as target torque. Hereinafter, the target torque will be called high-frequency target torque.

The present control device uses the low-frequency target torque as air quantity controlling torque. The low-frequency target torque is inputted in the target air quantity calculating section 4, and is converted into a target air quantity (target KL) according to the air quantity map of the target air quantity calculating section 4. The target air quantity is inputted in the target throttle opening calculating section 6, and is converted into a target throttle opening (target TA) according to the air inverse model of the target throttle opening calculating section 6. The present control device performs operation of the throttle in accordance with the target throttle opening calculated in the target throttle opening calculating section 6.

Meanwhile, in regard with the high-frequency target torque, the present control device uses it as air-fuel ratio controlling torque. The high-frequency target torque outputted from the torque combining section 14 is inputted in the target air-fuel ratio calculating section 8, and is converted into the target air-fuel ratio according to the air-fuel ratio map of the target air-fuel ratio calculating section 8. The target air-fuel ratio is the air-fuel ratio which is necessary for realization of the high-frequency target torque under the present air quantity and the present engine speed, on the precondition that the ignition timing is the optimal ignition timing. The high-frequency target torque is the torque obtained by combining the low-frequency target torque and the sprung mass vibration damping required torque, and therefore, the target air-fuel ratio which is outputted from the target air-fuel ratio calculating section 8 periodically changes with the same frequency as the sprung mass vibration damping required torque with the base air-fuel ratio as the center. The present control device performs operation of the fuel injection device in accordance with the target air-fuel ratio which periodically changes with a high-frequency like this.

The present control device uses the required torque which is outputted from the power train manager 12, that is, the low-frequency target torque (air quantity controlling torque) for ignition timing control. Therefore, the ignition timing calculating section 10 receives the duplicate of the required torque which is outputted from the power train manager 12. The ignition timing calculating section 10 converts the low-frequency target torque into ignition timing by using the ignition timing map. In the present embodiment, the present air quantity, and the engine speed are used for search of the ignition timing map. Further, in regard with the air-fuel ratio, a base air-fuel ratio (for example, a stoichiometric air-fuel ratio) is used for map search, instead of the target air-fuel ratio which is outputted from the target air-fuel ratio calculating section 8. The reason of using the base air-fuel ratio instead of the target air-fuel ratio is to prevent periodic change of the torque which is realized by air-fuel ratio control from being cancelled out by correction of the ignition timing. The ignition timing which is calculated in the ignition timing calculating section 10 approximately becomes optimal ignition timing except for the transition state in which the air quantity is changing. The present control device performs operation of the ignition device in accordance with the ignition timing calculated in the ignition timing calculating section 10.

According to the configuration as above, out of the low-frequency component and the high-frequency component included in the required torque, only the low-frequency component is reflected in the target air quantity, and the high-frequency component is reflected in the target air-fuel ratio, similarly to embodiment 1. Consequently, according to the present control device, the required torque can be realized with high responsiveness, while the throttle is stably operated, as in the control device of embodiment 1.

Embodiment 3

Next, embodiment 3 of the present invention will be described with reference to FIG. 4.

Figure 4:
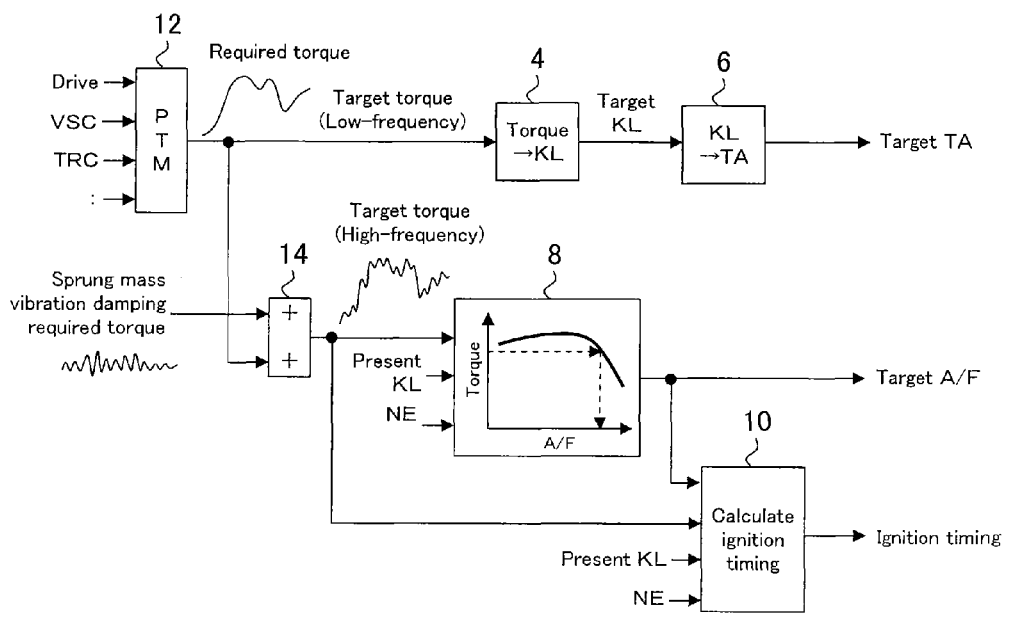
FIG. 4 is a block diagram showing a configuration of a control device for an internal combustion engine of embodiment 3 of the present invention.

FIG. 4 is a block diagram showing a configuration of a control device of embodiment 3 of the present invention. The present control device can be divided into the power train manager (PTM) 12, the target air quantity calculating section 4, the target throttle opening calculating section 6, the torque combining section 14, the target air-fuel ratio calculating section 8 and the ignition timing calculating section 10 according to the functions which the control device has. More specifically, the individual functional elements 12, 4, 6, 14, 8 and 10 which the present control device has are common to embodiment 2. However, a difference from embodiment 2 lies in input and output of signals among the elements. In the following description, the configuration of the present control device will be described with a focus on the difference from embodiment 2.

One difference of the present control device from embodiment 2 lies in the point that high-frequency target torque, that is, air-fuel ratio controlling torque is used for ignition timing control, instead of low-frequency target torque. Therefore, the duplicate of the high-frequency target torque which is outputted from the torque combining section 14 is inputted into the ignition timing calculating section 10. The ignition timing calculating section 10 converts the high-frequency target torque into ignition timing by using the ignition timing map. Another difference of the present control device from embodiment 2 is that the target air-fuel ratio which is outputted from the target air-fuel ratio calculating section 8 is used for search of the ignition timing map. Accordingly, the ignition timing necessary for realization of the high-frequency target torque in the case in which the air-fuel ratio is a target air-fuel ratio is calculated as the ignition timing of the engine from the ignition timing calculating section 10. This point is similar to the case of embodiment 1.

According to the configuration as above, even if the high-frequency target torque cannot be completely realized by the air-fuel ratio control, the excess or deficiency can be compensated by correction of the ignition timing. Consequently, according to the present control device, the advantage is provided, that the required torque including a high-frequency component can be realized with higher precision while worsening of the fuel consumption performance accompanying retardation of the ignition timing is suppressed to the minimum, when compared with embodiment 2.

Embodiment 4

Next, embodiment 4 of the present invention will be described with reference to FIG. 5 and FIG. 6.

Figure 5:
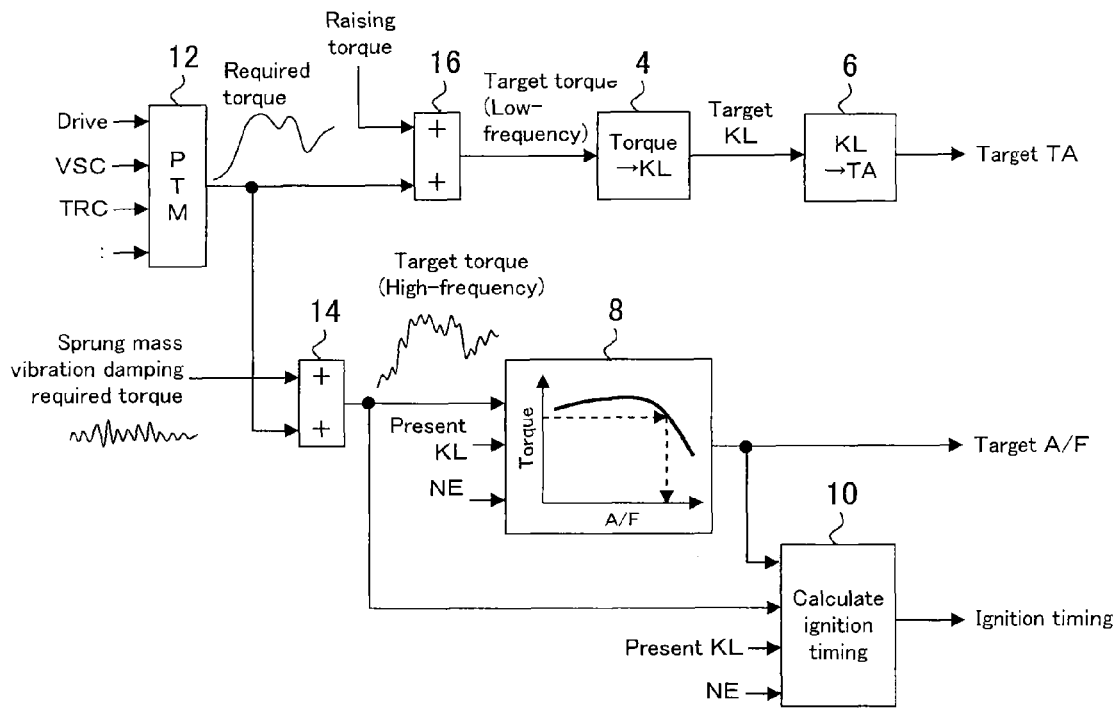
FIG. 5 is a block diagram showing a configuration of a control device for an internal combustion engine of embodiment 4 of the present invention.

FIG. 5 is a block diagram showing a configuration of a control device of embodiment 4 of the present invention. The present control device can be divided into the power train manager (PTM) 12, a low-frequency target torque raising section 16, the target air quantity calculating section 4, the target throttle opening calculating section 6, the torque combining section 14, the target air-fuel ratio calculating section 8 and the ignition timing calculating section 10 according to the functions which the control device has. As is understandable when FIG. 5 and FIG. 4 are compared, the present control device has the configuration in which the low-frequency target torque raising section 16 is newly added to the control device of embodiment 3. In the following description, the configuration of the present control device will be described with a focus on a function of the low-frequency target torque raising section 16 which is newly provided in the present embodiment.

The low-frequency target torque raising section 16 is disposed between the power train manager 12 and the target air quantity calculating section 4. In the present control device, the required torque outputted from the power train manager 12 is firstly inputted in the low-frequency target torque raising section 16. The low-frequency target torque raising section 16 adds raising torque to the inputted required torque, and inputs the raised required torque into the target air quantity calculating section 4 as low-frequency target torque, that is, air quantity controlling torque. The magnitude of the raising torque is set in accordance with the amplitude of the sprung mass vibration damping required torque. For example, if the amplitude of the sprung mass vibration damping required torque is ±4 Nm, the raising torque is set to the magnitude of +4 Nm. The low-frequency target torque is raised by the amount of the raising torque, whereby the target air quantity is also raised, and as a result, the actual air quantity (present air quantity) is also raised.

Meanwhile, the duplicate of the required torque outputted from the power train manager 12, that is, the required torque which is not raised is inputted into the torque combining section 14, as in embodiment 3. In the torque combining section 14, the required torque which is not raised is combined with the sprung mass vibration damping required torque, and the combined torque is used as high-frequency target torque, that is, air-fuel ratio controlling torque.

The high-frequency target torque is converted into a target air-fuel ratio (target A/F) in the target air-fuel ratio calculating section 8. In the air-fuel ratio map which is used in the conversion, the air-fuel ratio necessary for realization of the high-frequency target torque is searched for with the present air quantity and the engine speed as a key. In the present embodiment, by raising the low-frequency target torque which is used for calculation of the target air quantity, the present air quantity is raised more than the air quantity which is necessary when the base air-fuel ratio is set as the precondition. Therefore, the air-fuel ratio which is necessary for realization of the high-frequency target torque is offset to a leaner side than the original one. Accordingly, in the present embodiment, the target air-fuel ratio which is outputted from the target air-fuel ratio calculating section 8 periodically changes with the same frequency as the sprung mass vibration damping required torque with the air-fuel ratio which is offset to a leaner side than the base air-fuel ratio as the center. The present control device performs operation of the fuel injection device in accordance with the target air-fuel ratio which periodically changes in a region at a leaner side than the base air-fuel ratio like this.

Figure 6:
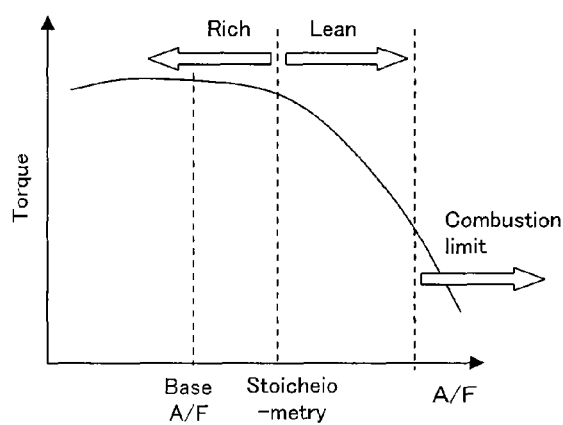
FIG. 6 is a diagram showing an A/F—torque characteristic.

Here, FIG. 6 is an A/F-torque characteristic diagram showing a relationship of an air-fuel ratio and torque when an air quantity and an engine speed are made constant. As shown in the diagram, in the region at a leaner side than stoichiometry, the torque becomes larger, as the air-fuel ratio becomes richer, but when the air-fuel ratio becomes rich beyond stoichiometry, the sensitivity of the torque to change of the air-fuel ratio becomes low. Further, when the air-fuel ratio is made excessively rich, reduction of torque occurs conversely. According to the A/F-torque characteristic like this, it is understandable that the torque amplitude for realizing high-frequency target torque is difficult to secure depending on the center of the amplitude at the time when the target air-fuel ratio periodically changes. For example, as shown in FIG. 6, when the base air-fuel ratio is set at the richer side than stoichiometry, a required torque amplitude cannot be obtained even if the target air-fuel ratio is changed with the base air-fuel ratio as the center.

The configuration which is adopted by the present control device is the configuration for coping with the circumstances as described above. More specifically, according to the present control device, as a result that the present air quantity is increased by raising the target air quantity, the center of vibration of the target air-fuel ratio is offset to a leaner side than the base air-fuel ratio. In addition, the raising amount of the air quantity controlling torque (low-frequency target torque) is set to be equal to the amplitude of the sprung mass vibration damping required torque, and therefore, the center of vibration is offset to the lean side so that the richest air-fuel ratio at the time of the target air-fuel ratio periodically changing becomes the base air-fuel ratio. According to this, the situation in which torque becomes insufficient due to insufficiency of the air quantity is prevented, and the torque amplitude which is necessary for realization of high-frequency target torque can be reliably secured. According to the present control device, irrespective of setting of the base air-fuel ratio, the required torque can be reliably realized with high responsiveness.

As shown in FIG. 6, the air-fuel ratio has the lower limit which is determined by a combustion limit. It is not preferable to make the air-fuel ratio lean beyond the lower limit air-fuel ratio. Therefore, a guard by the lower limit air-fuel ratio is applied to the target air-fuel ratio which is outputted from the target air-fuel ratio calculating section 8. However, when the target air-fuel ratio is guarded by the lower limit air-fuel ratio, the torque which can be realized by air-fuel ratio control is limited to the torque which is determined by the lower limit air-fuel ratio. More specifically, the required torque cannot be completely realized with only air-fuel ratio control. In this case, according to the configuration of the present control device, the ignition timing is corrected to a retardation side to cut off the excessive amount of the torque with respect to the required torque. As a result, even when the target air-fuel ratio is guarded by the lower limit air-fuel ratio, realization of the required torque with high precision is ensured. In this regard, the same can be said of the control devices of embodiments 1 to 3 described above.

Embodiment 5

Next, embodiment 5 of the present invention will be described with reference to FIG. 7.

Figure 7:
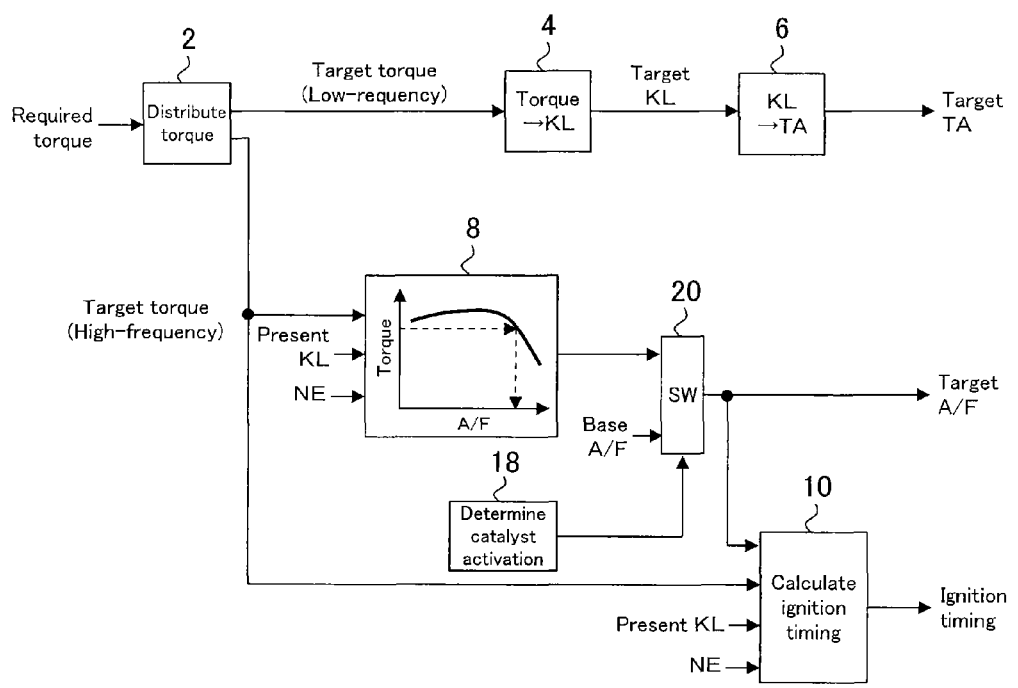
FIG. 7 is a block diagram showing a configuration of a control device for an internal combustion engine of embodiment 5 of the present invention.

FIG. 7 is a block diagram showing a configuration of a control device of embodiment 5 of the present invention. The present control device can be divided into the torque distributing section 2, the target air quantity calculating section 4, the target throttle opening calculating section 6, the target air-fuel ratio calculating section 8, a catalyst activation determining section 18, a target air-fuel ratio switching section 20 and the ignition timing calculating section 10 according to the functions which the control device has. As is understandable when FIG. 7 and FIG. 1 are compared, the present control device has the configuration in which the catalyst activation determining section 18 and the target air-fuel ratio switching section 20 are newly added to the control device of embodiment 1. In the following description, the configuration of the present control device will be described with a focus on the functions of the two elements 18 and 20 which are newly provided in the present embodiment.

The catalyst activation determining section 18 determines the activation state of a catalyst which is disposed in an exhaust passage of the engine. The determination thereof is performed from the viewpoints of a catalyst temperature, a catalyst deterioration degree, a catalyst poisoned state and the like. As the catalyst temperature, a catalyst bed temperature which can be measured by a sensor can be used as a representative value thereof. Further, the catalyst temperature also can be measured from an accumulated air quantity. Alternatively, the catalyst temperature also can be estimated according to an exhaust system model. The deterioration degree of a catalyst can be determined from an OBD parameter such as a maximum oxygen occlusion amount (Cmax) of the catalyst, an output trajectory length of an $O_2$ sensor. The poisoned state of a catalyst can be determined from detection of a sulfur content included in a fuel, and a control state of A/F feedback control.

The reason of determining the activation state of the catalyst in the present control device is to prevent the situation in which the exhaust gas performance is worsened as a result of actively varying the air-fuel ratio to realize the required torque. When the activation of the catalyst is insufficient, purification performance by the catalyst cannot be sufficiently secured. If the air-fuel ratio is varied under such a situation, worsening of the exhaust gas performance is caused by increase of exhaust emission. The exhaust gas performance is an especially important performance among various performances required of an automobile. When it is determined that the catalyst is not activated, the present control device prevents worsening of the exhaust gas performance by prohibiting variation of the target air-fuel ratio.

In the present control device, the target air-fuel ratio which is outputted from the target air-fuel ratio calculating section 8 is inputted in the target air-fuel ratio switching section 20 together with the base air-fuel ratio. The target air-fuel ratio switching section 20 outputs any one of two inputted signals as a target air-fuel ratio. The determination result by the catalyst activation determining section 18 is used in switching of the output. When the determination result is affirmative, the target air-fuel ratio outputted from the target air-fuel ratio calculating section 8 is selected, and directly outputted as the target air-fuel ratio. However, when the determination result is negative, selection in the target air-fuel ratio switching section 20 is switched, and the base air-fuel ratio is outputted as the target air-fuel ratio. By this, variation of the air-fuel ratio is prohibited, and worsening of the exhaust gas performance is prevented.

Even when the target air-fuel ratio is switched to the base air-fuel ratio, according to the configuration of the present control device, the required torque including a high-frequency component can be realized. In this case, the ignition timing which is calculated by the ignition timing calculating section 10 is advanced or retarded in accordance with the high-frequency component. By this, even when variation of the target air-fuel ratio is prohibited, realization of the required torque with high precision is ensured.

Others

The embodiments of the present invention are described above, but the present invention is not limited to the aforementioned embodiments, and can be carried out by being variously modified within the range without departing from the gist of the present invention. For example, as the element which extracts a low-frequency component in the torque distributing section 2 of embodiment 1, a physical model of a lag system such as an air model can be used instead of a low-pass filter.

Further, in embodiment 4, a stoichiometric air-fuel ratio may be used for search of the air quantity map in the target air quantity calculating section 4. More specifically, in place of determining a target air quantity from the torque-air quantity characteristic under the base air-fuel ratio, the target air quantity may be determined from the torque-air quantity characteristic under the stoichiometric air-fuel ratio. By doing so, the target air-fuel ratio can be periodically changed in the region with high torque sensitivity at a leaner side than stoichiometry, irrespective of setting of the base air-fuel ratio.

Further, in embodiment 5, instead of prohibiting variation of the target air-fuel ratio, limiting the amplitude of the vibration with the base air-fuel ratio as the center may be employed. The magnitude of the amplitude which is permitted in this case can be determined in accordance with the activation state of the catalyst. For example, the amplitude of the target air-fuel ratio which is permitted may be made larger, as activation of the catalyst advances. The catalyst activation determining section 18 and the target air-fuel ratio switching section 20 which are the characteristics of embodiment 5 may be provided in the control devices of embodiments 1 to 4.

Further, in each of the embodiments described above, the oxygen occlusion state of the catalyst may be determined, and the region in which the target air-fuel ratio is varied may be changed in accordance with the oxygen occlusion state. More specifically, when the oxygen occlusion amount of the catalyst is a predetermined value or larger, or the output of the $O_2$ sensor downstream of the catalyst is lean output, the target air-fuel ratio is varied with the region at a richer side than stoichiometry as a center. Conversely, when the oxygen occlusion amount of the catalyst is less than the predetermined value, or when the output of the $O_2$ sensor downstream of the catalyst is rich output, the target air-fuel ratio is varied with the region at a leaner side than stoichiometry as the center. By doing so, the oxygen occlusion state of the catalyst can be kept in a proper state while the air-fuel ratio is varied in accordance with the high-frequency component of the required torque. As the method for changing the region in which the target air-fuel ratio is varied, the method of embodiment 4 can be applied. If the low-frequency target torque (air quantity controlling torque) is corrected to an increase side, the center of vibration of the target air-fuel ratio can be offset to the lean side, and in contrast with this, if the low-frequency target torque is corrected to a decrease side, the center of vibration of the target air-fuel ratio can be offset to the rich side.

DESCRIPTION OF REFERENCE NUMERALS

2 Torque distributing section
4 Target air quantity calculating section
6 Target throttle opening calculating section
8 Target air-fuel ratio calculating section
10 Ignition timing calculating section
12 Power train manager
14 Torque combining section
16 Low-frequency target torque raising section
18 Catalyst activation determining section
20 Target air-fuel ratio switching section

The invention claimed is:

1. A control device for an internal combustion engine, comprising:
   required torque acquiring means that acquires required torque required of the internal combustion engine;
   air quantity controlling torque setting means that sets torque with a low frequency obtained from the required torque as air quantity controlling torque;
   air-fuel ratio controlling torque setting means that sets torque including both a low frequency and a high frequency which is obtained from the required torque as air-fuel ratio controlling torque;
   target air quantity calculating means that calculates a target air quantity for realizing the air quantity controlling torque, based on data in which a relationship of an air quantity and torque is set;
   air quantity controlling means that controls an air quantity in accordance with the target air quantity;
   present air quantity calculating means that calculates a present air quantity;
   target air-fuel ratio calculating means that calculates an air-fuel ratio corresponding to the air-fuel ratio controlling torque and the present air quantity as a target air-fuel ratio based on data in which a relationship of an air-fuel ratio and torque is set by being associated with an air quantity; and fuel injection amount controlling means that controls a fuel injection amount in accordance with the target air-fuel ratio.

2. The control device for an internal combustion engine according to claim 1, further comprising:

target ignition timing calculating means that calculates target ignition timing for realizing the air-fuel ratio controlling torque under the present air quantity and the target air-fuel ratio based on data in which a relationship of ignition timing and torque is set by being associated with an air quantity and an air-fuel ratio; and ignition timing controlling means that controls ignition timing in accordance with the target ignition timing.

3. The control device for an internal combustion engine according to claim 1, further comprising:

air quantity controlling torque correcting means that corrects the air quantity controlling torque by raising the air quantity controlling torque.

4. The control device for an internal combustion engine according to claim 3, wherein the air quantity controlling torque correcting means raises the air quantity controlling torque by an amount of an amplitude of the high-frequency torque.

5. The control device for an internal combustion engine according to claim 1, further comprising:

oxygen occlusion state determining means that determines an oxygen occlusion state of a catalyst; and air quantity controlling torque correcting means that corrects the air quantity controlling torque so that an air-fuel ratio varies with a region at a richer side than stoichiometry as a center when an oxygen occlusion amount of the catalyst is a predetermined value or larger, and corrects the air quantity controlling torque so that the air-fuel ratio varies with a region at a leaner side than stoichiometry as the center when the oxygen occlusion amount of the catalyst is less than the predetermined value.

6. The control device for an internal combustion engine according to claim 1, further comprising:

activation state determining means that determines an activation state of a catalyst; and target air-fuel ratio variation restricting means that restricts variation of the target air-fuel ratio when the catalyst is not activated.

7. The control device for an internal combustion engine according to claim 1, wherein the required torque acquiring means includes means that acquires required torque including both a low-frequency component and a high-frequency component, and means that extracts the low-frequency component from the required torque.

8. The control device for an internal combustion engine according to claim 1, wherein the required torque acquiring means includes means that acquires required torque comprising a low-frequency component, means that acquires required torque comprising a high-frequency component, and means that combines the required torque with the low frequency and the required torque with the high frequency.

9. A control device for an internal combustion engine, comprising:

a first calculator that is programmed to:

acquire required torque required of the internal combustion engine;

set torque with a low frequency obtained from the required torque as air quantity controlling torque;

set torque including both a low frequency and a high frequency which is obtained from the required torque as air-fuel ratio controlling torque; and calculate a target air quantity for realizing the air quantity controlling torque, based on data in which a relationship of an air quantity and torque is set;

a first controller that is programmed to control an air quantity in accordance with the target air quantity;

a second calculator that is programmed to:

calculate a present air quantity; and calculate an air-fuel ratio corresponding to the air-fuel ratio controlling torque and the present air quantity as a target air-fuel ratio based on data in which a relationship of an air-fuel ratio and torque is set by being associated with an air quantity; and a second controller that is programmed to control a fuel injection amount in accordance with the target air-fuel ratio.

10. The control device for an internal combustion engine according to claim 9, further comprising:

a third calculator that is programmed to calculate target ignition timing for realizing the air-fuel ratio controlling torque under the present air quantity and the target air-fuel ratio based on data in which a relationship of ignition timing and torque is set by being associated with an air quantity and an air-fuel ratio; and a third controller that is programmed to control ignition timing in accordance with the target ignition timing.

11. The control device for an internal combustion engine according to claim 9, wherein the first calculator is further programmed to correct the air quantity controlling torque by raising the air quantity controlling torque.

12. The control device for an internal combustion engine according to claim 11, wherein the first calculator is programmed to raise the air quantity controlling torque by an amount of an amplitude of the high-frequency torque.

13. The control device for an internal combustion engine according to claim 9, wherein the first calculator is further programmed to:

determine an oxygen occlusion state of a catalyst;

correct the air quantity controlling torque so that an air-fuel ratio varies with a region at a richer side than stoichiometry as a center when an oxygen occlusion amount of the catalyst is a predetermined value or larger; and correct the air quantity controlling torque so that the air-fuel ratio varies with a region at a leaner side than stoichiometry as the center when the oxygen occlusion amount of the catalyst is less than the predetermined value.

14. The control device for an internal combustion engine according to claim 9, wherein the first calculator is further programmed to:

determine an activation state of a catalyst; and restrict variation of the target air-fuel ratio when the catalyst is not activated.

15. The control device for an internal combustion engine according to claim 9, wherein the first calculator is programmed to:

acquire required torque including both a low-frequency component and a high-frequency component; and extract the low-frequency component from the required torque.

16. The control device for an internal combustion engine according to claim 9,
wherein the first calculator is programmed to:
acquire required torque comprising a low-frequency component;
acquire required torque comprising a high-frequency component; and
combine the required torque with the low frequency and the required torque with the high frequency.

* * * * *